Figure 1:
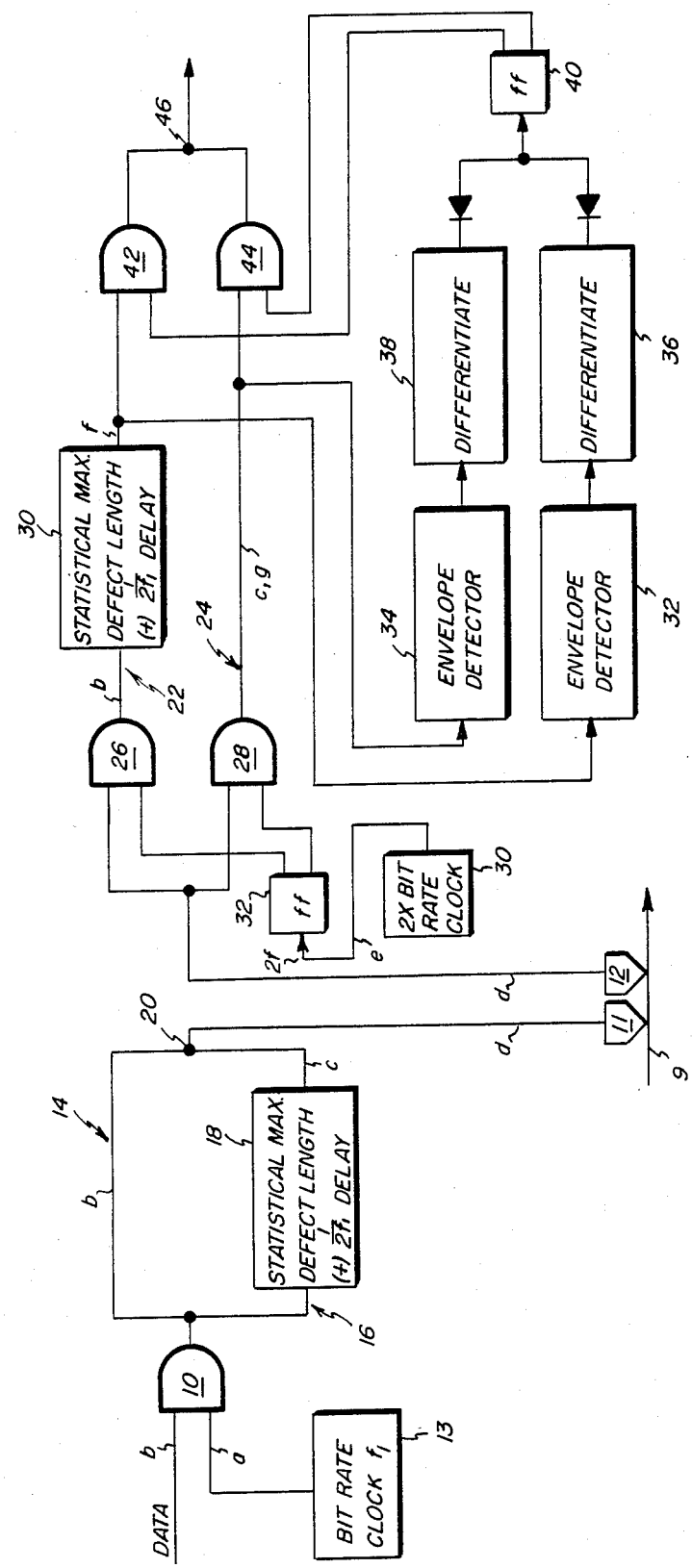

United States Patent [19]

Veillard

[11] Patent Number: 4,506,306
[45] Date of Patent: Mar. 19, 1985

[54] INTERLEAVED REDUNDANCY IN DATA RECORDING

[75] Inventor: Dominique H. Veillard, San Diego, Calif.

[73] Assignee: Eastman Kodak Company, Rochester, N.Y.

[21] Appl. No.: 440,142

[22] Filed: Nov. 8, 1982

[51] Int. Cl.³ .............................................. G11B 5/09
[52] U.S. Cl. ........................................ 360/47; 360/53
[58] Field of Search .................... 360/47, 53, 24, 54

[56] References Cited

U.S. PATENT DOCUMENTS 3,883,891 5/1975 Thompson et al. ................. 360/47

*Primary Examiner*—Vincent P. Canney
*Attorney, Agent, or Firm*—Robert F. Cody

[57] ABSTRACT

The concept of the disclosed invention is to interleave a data bit stream with itself in such a way that the respective interleaved portions are displaced from each other, within the medium, by a distance corresponding to at least the statistical maximum size of the defects. In the event, during playback, that a dropout should occur, that dropout—inherently—must affect both interleaved portions. Therefore, by continuously delaying timewise one such interleaved playback portion relative to the other for a time sufficient to bring the two playback portions into sync with each other, the original bit stream may be reconstituted by toggling back and forth between the two playback portions each time a dropout is detected in either playback portion.

10 Claims, 2 Drawing Figures

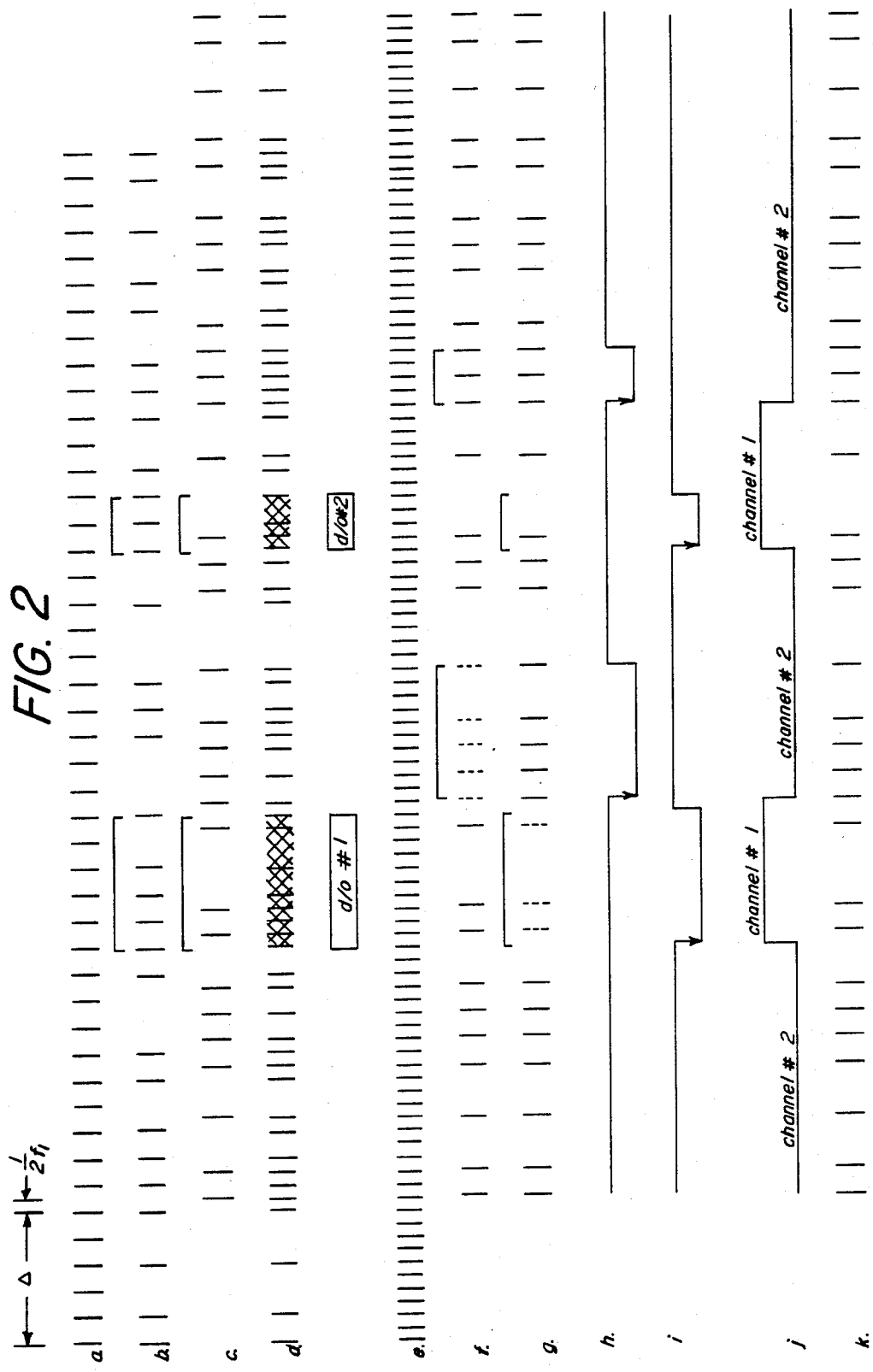

INTERLEAVED REDUNDANCY IN DATA RECORDING

BACKGROUND OF THE INVENTION (1) Field of the Invention

This invention relates in general to data recording and, more particularly, to a technique for preventing the loss of data from or during a recording operation.

(2) Description Relative to the Prior Art (Problem)

Technologies which are associated with information recording have made spectacular progress toward tapping the information bearing potential of magnetic surfaces. A roadblock to achieving very short wavelength recording however is the occurrence of signal losses associated with small imperfections in such surfaces. When a magnetic surface is used at a conservative recording density, a surface defect seldom results in a loss worse than a burst error of a few bits of digital information. Error correcting codes have been devised to accommodate the occurrence of burst errors. Such codes reconstruct data integrity by using redundant information systematically incorporated into the recording format. The complexity and cost of these methods however is exponentially dependent upon the length of the burst errors that they are required to handle. At the present state-of-the-art, the use of large scale integration has made practical the implementation of burst error correcting codes which can correct up to 12 bits of burst errors.

When one records with a very short gap head (a la U.S. Pat. No. 4,302,790) to take advantage of the very short wavelength capability of a high coercivity isotropic magnetic surface, the gain in recording density is so dramatic that the same surface defect—which in the prior are corresponded to, say, a burst error of 12 bits—can now result in a burst error of several hundred bits. Clearly, the recovery from such burst errors is no longer within the realm of practical error correcting codes.

SUMMARY OF THE INVENTION (Problem Solution)

In recognition of the fact that magnetic tapes are characterized by a statistical maximum size for the surface defects thereof, the concept of the invention is to interleave a data bit stream with itself in such a way that the respective interleaved portions are displaced from each other, within the medium, by a distance corresponding to at least the statistical maximum size of the defects. In the event, during playback, that a dropout should occur, that dropout—inherently—must affect both interleaved portions. Therefore, by continuously delaying timewise one such interleaved playback portion relative to the other for a time sufficient to bring the two playback portions into sync with each other, the original bit stream may be reconstituted by toggling back and forth between the two playback portions each time a dropout is detected in either playback portion. Such a practice for the recovery of an original bit stream may be implemented with complete disregard for the spacing, within the medium, between defects—and without regard for the size of the defects in question (so long as they are less in length than the statistical maximum length for such defects).

The invention will now be described with reference to the Figures of which

FIG. 1 is a schematic block diagram of record and playback circuits for practicing the invention, and FIG. 2, consisting of a-k, is a set of diagrams useful in explaining the operation of the apparatus of FIG. 1.

Referring to FIG. 1, data to be recorded in a magnetic medium 9, and which is in the form of a stream of data bits, is applied to an AND gate 10 for clocking therethrough by means of a clock. The medium 9 is adapted to be moved, at a nominal rate, relative to record and reproduce magnetic heads 11,12. The clock has the bit rate ($f_1$) of the data bits in the data bit stream; and such clock is produced by means of a clock source 13. The data bit stream appearing at the output of the gate 10 is applied to separate signal processing channels 14,16, the latter containing a delay device 18 that provides a signal delay corresponding to the statistical maximum length of a defect within the medium 9 plus the distance that the medium would move (at its nominal speed) relative to the heads 11,12 in a time that corresponds to one-half the period between clock pulses. Given that the data bits occur at a rate as indicated in diagram a, FIG. 2, this means that if a data bit stream as indicated in diagram b, FIG. 2, is applied to the data processing channel 16, it gets shifted timewise as indicated in diagram c, FIG. 2—the displacement Δ appearing in FIG. 2 corresponding to the statistical maximum length of a defect to be found in the surface of the medium 9. (The letters associated with the waveform diagrams are indicated at appropriate points in the circuit diagram of FIG. 1 to facilitate understanding of the invention). Thus, when the data bit streams of the signal processing channels 14,16 get summed at a summing point 20, they get interleaved with each other (in somewhat of a cryptic manner—which may be of advantage in certain applications), the interleaved data bits taking the form depicted in diagram d, FIG. 2. (Brackets associated with diagrams b,c—at this point in the description—are of no relevance, but will be discussed later.) The interleaved data bits of diagram d, FIG. 2, are then applied to the magnetic head 11 for recording in the magnetic medium 9.

During playback, the interleaved data bits are sensed by the magnetic head 12 (although in some applications the head 11 may be used for both record and playback), the signals resulting from such sensing being applied to a pair of signal processing channels 22,24. The signal processing channel 22 contains an input AND gate 26; the signal processing channel 24 contains an input AND gate 28; and each such AND gate is operated at twice the bit rate, i.e. at $2f_1$, under control of a clock 30 and a flip-flop 32. See diagram e, FIG. 2. Attendantly the played back data bits are alternately applied to the channels 22,24, with the result being that non-interleaved bit streams, as in diagrams b,c, FIG. 2, appear at the respective outputs of the AND gates 26,28. By applying the heretofore undelayed data bit stream of the signal processing channel 22 to a delay device 30—like the delay device 18 of the record portion of the FIG. 1 circuit—the two bit streams of the signal processing channels 22,24 are brought into sync with each other, as depicted in diagrams f,g, FIG. 2.

Assuming the recording medium 9 has surface defects which cause, say, signal dropouts like dropouts d/o#1 and d/o#2—the former having the statistical maximum length Δ and the latter having a length less than the length Δ—this means that the bits corresponding to the dropouts (identified by crosshatching in diagram d, FIG. 2, and in phantom in diagrams f,g, FIG. 2) will be lost during playback. In other words, the bracketed bits of diagrams b,c, FIG. 2, because they were interleaved, get lost at the surface of the medium 9. Because of the relative shifting of the data bit streams in the signal processing channels 22,24 to effect synchronization between the data bit stream, however, whatever specific bits are lost to one playback signal processing channel will, inherently, not be lost to the other channel, and vice versa. See the bracketed bits of diagrams f,g, FIG. 2. Thus, by toggling back and forth between the signal processing channels at appropriate times, the originally recorded bit stream may be recovered—and such despite the existence of the indicated dropouts:

The "defective", but synchronized, data bit streams of the signal processing channels 22,24 are respectively applied to envelope detectors 32,34. The envelope detectors, which may for example be signal integrating devices, apply their respective output signals (diagrams h,i, FIG. 2) to corresponding differentiating devices 36,38, whereby at the start of any dropped-out part of the signal envelopes (downwardly pointed arrows in diagrams h,i, FIG. 2), a negative-going spike signal is caused to appear at the appropriate output of the differentiating devices 36,38. The negative-going spike signals are applied to a flip-flop 40 which toggles a pair of output AND gates 42,44 alternately into operation. As a result, depending on which AND gate 42 or 44 has been toggled into operation, the data bit stream (diagram k, FIG. 2) appearing at a circuit output summing point 46 will be derived from one or the other of the signal processing channels 22,24—and attendantly the original bit stream of diagram b, FIG. 2, is reproduced, without error, in the form of the bit stream of diagram k, FIG. 2.

The invention has been described in detail with particular reference to preferred embodiments thereof, but it will be understood that variations and modifications can be effected within the spirit and scope of the invention.

What is claimed is:

1. Apparatus for assuring against the loss of data bits in the recording of such bits in a magnetic medium in which the statistically largest surface defect thereof has a size of a certain given length comprising
    (a) means for producing first and second identical streams of data bits and for interleaving bit-by-bit said bits in such a way that, as recorded in said medium at a nominal recording speed, the bits of one stream are displaced from corresponding bits of the other stream by a distance that is at least said given length, said bits in said streams of data bits occurring at a given bit rate,
    (b) magnetic head means,
    (c) means for providing relative motion at said nominal recording speed between said magnetic head means and said medium, and
    (d) means for applying said interleaved data bits to said magnetic head means for the recording thereof in said medium, whereby by separating the interleaved bit streams during playback, and by then bringing such bit streams into sync with each other, a dropout of bits from one stream will serve as a harbinger of a dropout of bits from the other stream, and vice versa, thereby to allow toggling between the bit streams to form an error-free bit stream that is identically like either said first or said second bit stream.

2. The apparatus of claim 1 wherein said means for producing first and second identical streams of interleaved data bits comprises
    (a) first and second signal processing channels adapted to receive and process simultaneously the same stream of input data bits, and
    (b) summing means for receiving and summing the output of said signal processing channels one of said channels including therein means for delaying the bits thereof for a duration sufficient to effect said bit stream displacement and interleaving.

3. The apparatus of claim 2 wherein said means for delaying provides a bit delay that is such that each given bit within the stream of data bits processed by the signal processing channel containing said means for delaying is delayed for a time corresponding to the time it takes for said magnetic head means to traverse the statistically largest surface defect of said medium at the nominal recording speed plus a time corresponding to a multiple of one-half the time period associated with said bit rate.

4. The apparatus of claim 1 further including playback apparatus, said apparatus comprising
    (a) means for separating said first and second interleaved bit streams and for relatively shifting them timewise to effect synchronism therebetween,
    (b) means for detecting the dropout of bits in both said separated bit streams, and
    (c) means responsive to said detecting means for toggling between said bit streams to effect a bit stream like either said first or said second bit stream.

5. The apparatus of claim 4 wherein said means for separating and relatively shifting comprises
    (a) first and second signal processing channels
    (b) means for alternately applying, at twice said bit rate, the bits of the interleaved first and second bit streams to said first and second channels, thereby to cause each said channel to process a respective bit stream, and
    (c) means in one of said channels for delaying the bits therein for a time sufficient to bring the corresponding bits processed by said first and second channels into sync with each other.

6. The apparatus of claim 5 wherein said means for delaying provides a bit delay that is such that each given bit within the stream of data bits processed by the signal processing channel containing said means for delaying is delayed for a time corresponding to the time it takes for said magnetic head means to traverse the statistically largest surface defect of said medium at the nominal recording speed plus a time corresponding to a multiple of one-half the time period associated with said bit rate.

7. Apparatus for reproducing an original data bit stream that had been redundantly recorded bit-by-bit in a magnetic medium as a pair of discrete interleaved bit stream portions, one such bit stream portion being displaced with respect to the other by a distance corresponding to at least the statistical maximum length for a surface defect in said medium, said apparatus comprising
    (a) playback means for separating said interleaved bit stream portions and for relatively shifting them timewise to effect synchronism between them,
    (b) means for detecting the dropout of bits in both said separated bit stream portions, and (c) means responsive to said detecting means for toggling between said separated bit stream portions to effect said original data bit stream.

8. The apparatus of claim 7 wherein said means for separating and relatively shifting comprises
   (a) first and second signal processing channels,
   (b) means for alternately applying, at twice the bit rate of said original data bit stream, the bits of the interleaved bit stream portions to said first and second signal processing channels, thereby to cause each said channel to process a respective bit stream portion, and
   (c) means in one of said channels for delaying the bits therein for a time sufficient to bring the corresponding bits processed by said channels into sync with each other.

9. The apparatus of claim 8 wherein said means for delaying provides a bit delay that is such that each given bit within the bit stream portion processed by the signal processing channel containing said means for delaying is delayed for a time corresponding to the time it takes for said magnetic head means to traverse the statistically largest surface defect of said medium at the nominal playback speed plus a time corresponding to a multiple of one-half the time period associated with said bit rate.

10. A method for errorlessly recording and reproducing data in the form of an original bit stream, said method comprising the steps of
   (a) interleaving the bit stream bit-by-bit with itself in such a way that the corresponding bits of the two interleaved portions are displaced with respect to each other by a distance that is at least as great as the size of the statistically largest surface defect which may be found in a recording medium for recording said data,
   (b) recording said data bit stream with said two portions interleaved,
   (c) reproducing the bits of said recorded data bit stream portions,
   (d) separating, and separately processing, said bit stream portions so that corresponding bits of the two bit stream portions are in sync, and
   (e) deriving said original bit stream by alternately switching between the bits of said bit stream portions each time a dropout is detected in one of said bit stream portions.

* * * * *